United States Patent
Iwamoto et al.

(10) Patent No.: US 9,648,418 B2
(45) Date of Patent: May 9, 2017

(54) ACTIVE NOISE CANCELLATION APPARATUS

(71) Applicant: TOKAI RUBBER INDUSTRIES, LTD., Aichi (JP)

(72) Inventors: Hiroshi Iwamoto, Aichi (JP); Kouichi Hasegawa, Aichi (JP); Mitsuyoshi Kondo, Aichi (JP); Naoya Oue, Aichi (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 303 days.

(21) Appl. No.: 14/456,338

(22) Filed: Aug. 11, 2014

(65) Prior Publication Data

US 2014/0348338 A1 Nov. 27, 2014

Related U.S. Application Data

(63) Continuation of application No. PCT/JP2013/070535, filed on Jul. 30, 2013.

(30) Foreign Application Priority Data

Sep. 25, 2012 (JP) .................. 2012-210993

(51) Int. Cl.
  *H04R 3/00* (2006.01)
  *F16F 7/10* (2006.01)
  *G10K 11/178* (2006.01)
(52) U.S. Cl.
  CPC ............ *H04R 3/002* (2013.01); *F16F 7/1011* (2013.01); *G10K 11/1784* (2013.01);
  (Continued)
(58) Field of Classification Search
  None
  See application file for complete search history.

(56) References Cited

U.S. PATENT DOCUMENTS 5,701,349 A * 12/1997 Sano ................. G10K 11/1786
  381/71.4
5,758,311 A * 5/1998 Tsuji .................. G10K 11/1784
  381/71.1
(Continued)

FOREIGN PATENT DOCUMENTS

JP   03-203792    9/1991
JP   7-199965     8/1995
(Continued)

OTHER PUBLICATIONS

Toshiro et al, english translation of "Active Noise Control Device". JP2011126299. pp. 1-9.*

(Continued)

*Primary Examiner* — Alexander Jamal
*Assistant Examiner* — Qin Zhu
(74) *Attorney, Agent, or Firm* — Greenblum & Bernstein, P.L.C.

(57) ABSTRACT

Provided is an active noise cancellation apparatus capable of reliably reducing road noise by reducing vibration of a vehicle component part which generates road noise by using a vibration generator. A plurality of reference signal detectors are placed respectively on right and left knuckles for respectively supporting right and left wheels. A vibration generator and an error signal detector are placed on a vehicle component part. A controller performs respective adaptive controls based on each of reference signals and an error signal so as to reduce the error signal, and controls the vibration generator based on a sum of respective output values of the adaptive controls.

9 Claims, 5 Drawing Sheets

(52) U.S. Cl.
CPC ............... *G10K 2210/1282* (2013.01); *G10K 2210/1291* (2013.01); *G10K 2210/3211* (2013.01)

(56) References Cited

U.S. PATENT DOCUMENTS

| | | | | |
|---|---|---|---|---|
| 7,062,049 B1* | 6/2006 | Inoue | ................ | G10K 11/1786 381/71.4 |
| 2002/0097884 A1* | 7/2002 | Cairns | ................ | G10K 11/1788 381/71.4 |
| 2011/0170701 A1* | 7/2011 | Sakamoto | ............ | G10K 11/178 381/73.1 |
| 2012/0189132 A1* | 7/2012 | Sakamoto | ............ | G10K 11/178 381/71.4 |
| 2012/0215405 A1* | 8/2012 | Matsuno | ............... | H03M 1/188 701/36 |
| 2012/0226414 A1* | 9/2012 | Tomizaki | ............. | F16F 15/002 701/36 |

FOREIGN PATENT DOCUMENTS

| | | |
|---|---|---|
| JP | 7-210179 | 8/1995 |
| JP | 7-281676 | 10/1995 |

OTHER PUBLICATIONS

English translation of JP2000211335. Aoki et al. pp. 1-7. Aug. 2, 2000.*

International Search Report, mailed Nov. 5, 2013, in corresponding International Application No. PCT/JP2013/070535.

* cited by examiner

ACTIVE NOISE CANCELLATION APPARATUS

CROSS-REFERENCE TO RELATED APPLICATION

This is a continuation of Application PCT/JP2013/070535, filed on Jul. 30, 2013, which is incorporated herein by reference.

The present invention is based on Japanese Patent Application No. 2012-210993, filed on Sep. 25, 2012, the entire contents of which are incorporated herein by reference.

BACKGROUND OF THE INVENTION

1. Field of the Invention

The present invention relates to an active noise cancellation apparatus for actively reducing road noise.

2. Description of the Related Art

It is known that road noise is generated due to wheel vibration derived from road surface roughness being transmitted to a floor panel and the like and causing the floor panel and the like to vibrate. Apparatus for actively reducing this road noise are described in PTLs 1 to 4.

The apparatus of PTLs 1 to 3 cancel road noise by detecting an acceleration as a reference signal by an acceleration sensor placed on a suspension, detecting acoustic pressure in a vehicle interior as an error signal by a microphone, and outputting control sound (secondary sound) by a speaker placed in the vehicle interior. PTL 2 also mentions that a vibration generator is placed on a floor panel to generate a secondary sound.

The apparatus described in PTL 4 comprises a vibration generator placed on a floor panel, uses vibration of a suspension as a reference signal and vibration of the floor panel as an error signal, and controls the vibration generator so as to reduce the error signal. The patent literature states that road noise can be reduced by suppressing vibration of the floor panel by this vibration generator control.

CITATION LIST

PTL 1: JP H3-203,792 A
PTL 2: JP H7-199,965 A
PTL 3: JP H7-210,179 A
PTL 4: JP H7-281,676 A

SUMMARY OF THE INVENTION

The apparatus of PTLs 1 to 3 cancel road noise by outputting control sound (secondary sound) by a speaker placed in a vehicle interior or a floor panel to serve as a speaker. In this case, quiet zones (noise cancellation areas) differ depending on frequencies. Since a quiet zone is a range of a half wavelength of frequency, the quiet zone is large in a low frequency range and small in a high frequency range. Therefore, noise cancellation effect in the vehicle interior is different depending on the location of a speaker. In short, the noise cancellation effect is highly dependent on the speaker location. Furthermore, since frequency to be controlled is in a very wide range, for example, from 30 Hz to 20 kHz, noise control using a speaker or the like requires a control circuit capable of high-speed arithmetic processing and this incurs high cost.

Therefore, it is suitable to reduce road noise not by generating control sound by a speaker or the like but by imparting vibration to a vehicle component part which is a cause of road noise generation and thereby reducing vibration of the vehicle component part.

Moreover, since there are a plurality of wheels which contact road surfaces, road noise is generated due to vibrations of the respective wheels being transmitted to a vehicle component part and causing the vehicle component part to vibrate. Therefore, even if vibration of only a certain wheel is used as a reference signal, road noise cannot be sufficiently reduced. Therefore, it is desired to use a plurality of reference signals for reducing vibration of a vehicle component part by a vibration generator.

Here, PTL 4 describes providing a plurality of acceleration sensors as reference signal detectors, but does not mention a relation between a plurality of reference signals and an adaptive filter. If a reference signal obtained by synthesizing accelerations detected by the plurality of acceleration sensors is employed, road noise cannot be sufficiently reduced.

The present invention has been made in view of these circumstances. It is an object of the present invention to provide an active noise cancellation apparatus capable of reliably reducing road noise by reducing vibration of a vehicle component part which generates road noise by using a vibration generator.

An active noise cancellation apparatus according to the present solution is an active noise cancellation apparatus for actively reducing road noise in an interior of a vehicle generated due to vibration input from road surfaces to wheels, comprising: a plurality of reference signal detectors placed on right and left knuckles for respectively supporting right and left wheels, and detecting, as reference signals, vibrations of the right and left wheels or noises caused by the vibrations of the right and left wheels, respectively; a vibration generator placed on a component part in a vibration transmission path from the wheels to the interior and applying vibration force to the component part; an error signal detector placed on the component part and detecting vibration of the component part as an error signal; and a controller for performing respective adaptive controls based on each of the reference signals and the error signal so as to reduce the error signal, and controlling the vibration generator based on a sum of output values of the respective adaptive controls.

According to the present solution, vibrational force generated by a vibration generator acts to reduce vibration of a component part of a vehicle on which an error signal detector is placed. Here, the vibration generator is placed on the same component part of the vehicle as the error signal detector. Therefore, the vibration generator generates vibrational force so as to reduce vibration of the component part on which the vibration generator itself is placed.

Please note that the vibration to be reduced by the vibration generator is components attributable to reference signals. Here, the reference signals are plural in number, and are respective vibrations or noises of right and left wheels. Accordingly, vibration components of a vehicle component part attributable to vibrations or the like of the right and left wheels are reduced by the vibration generator. In particular, the abovementioned vibration components of the vehicle component part on which an error signal detector is placed can be reliably reduced by using vibrations or noises of the right and left wheels as reference signals.

Furthermore, the controller performs respective adaptive controls based on each of the reference signals and an error signal so as to reduce the error signal. By doing so, respective output values of the adaptive controls become signals to reduce components of the error signal attributable to the respective reference signals. Subsequently, the controller controls the vibration generator based on a sum of the respective output values. By doing so, the active noise cancellation apparatus can reduce the components of the error signal attributable to the respective reference signals.

Hereinafter, preferred aspects of the active noise cancellation apparatus according to the present solution will be described.

Preferably, the vibration generator and the error signal detector are placed on a suspension member or each wheel housing for supporting each of the wheels. When compared to a case in which the vibration generator and the error signal detector are placed on a panel member, performance in reducing road noise can be improved and at the same time cost reduction can be attained owing to not requiring very high arithmetic processing speed. Furthermore, a reduction in size of the vibration generator can also be achieved.

Moreover, in addition to the suspension member or each of the wheel housings, it is also preferable to place the vibration generator and the error signal detector on a panel in a trunk room. The panel in the trunk room is located in an intermediate position between the right and left wheels and is a member which directly supports a suspension system. Therefore, the abovementioned problems are less liable to occur in the panel in the trunk room than in a floor panel. That is to say, road noise can be sufficiently reduced by placing the vibration generator and the error signal detector on the panel in the trunk room.

Furthermore, preferably, the vibration generator and the error signal detector are placed in a middle in a width direction of the vehicle. Consequently, distances from the right and left wheels can be approximately equal to each other. That is to say, distances from the respective reference signal detectors to the vibration generator and the error signal detector can be approximately equal to each other. This makes it easy to reliably reduce respective vibrations transmitted from the right and left wheels.

Besides, preferably, a plurality of sets of the plurality of reference signal detectors, the vibration generator, and the error signal detector are respectively placed on a front side and a rear side of the vehicle; and the controller controls the vibration generator on the front side of the vehicle based on the reference signals and the error signal on the front side of the vehicle, and the vibration generator on the rear side of the vehicle based on the reference signals and the error signal on the rear side of the vehicle.

Vibrations which are sources of road noise are input from respective wheels both on a front side and a rear side of the vehicle. Accordingly, road noise can be reliably reduced by reducing effects input from all the wheels. However, it incurs high cost to provide the same number of vibration generators and the like as that of wheels. Therefore, a plurality of vibration generators and the like are divided into two groups of front and rear sides of the vehicle. That is to say, a vibration generator placed on the front side of the vehicle is controlled based on right and left reference signals on the front side of the vehicle, while a vibration generator placed on the rear side of the vehicle is controlled based on right and left reference signals on the rear side of the vehicle. Consequently, road noise can be reliably reduced while attaining cost reduction.

When the plurality of vibration generators and the like are divided into two groups and respectively placed on the front side and the rear side of the vehicle, the controller may control the vibration generator on the front side and the vibration generator on the rear side in accordance with load distribution of one or more occupants and luggage. It requires large power consumption to control the plurality of vibration generators in every case. The power consumption can be reduced by controlling the plurality of vibration generators only in a case where control has a great effect. A location at which load of one or more occupants and luggage is greater has a greater effect on road noise. Therefore, both a reduction in road noise and a reduction in power consumption can be attained by respectively controlling the plurality of vibration generators on the front side and the rear side of the vehicle in accordance with load distribution of one or more occupants and luggage.

In addition to the above case in which the plurality of vibration generators and the like are divided into two groups of the front and rear side of the vehicle, the following configuration is possible: The vibration generator and the error signal detector can be placed on each of a right side and a left side of the vehicle; and the controller can respectively control the respective vibration generators on the right side and the left side based on the respective error signal detectors placed on the right side and the left side in accordance with load distribution of one or more occupants and luggage.

That is to say, the controller controls a plurality of vibration generators placed respectively on the right side and the left side in accordance with load distribution of one or more occupants and luggage. Consequently, road noise can be reduced while attaining a reduction in power consumption. In this case, the plurality of vibration generators can be placed on respective right and left portions of a suspension member or right and left tire housings.

DESCRIPTION OF THE PREFERRED EMBODIMENTS

Example 1

Overview of Active Noise Cancellation Apparatus

Figure 1:
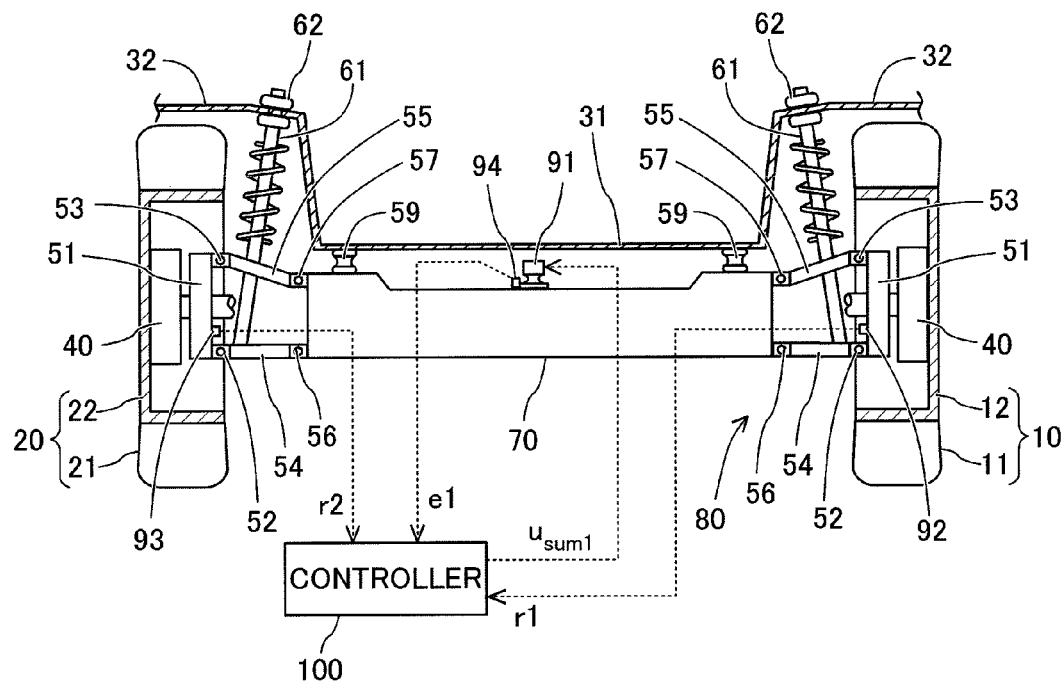
FIG. 1 is a view showing a configuration of an active noise cancellation apparatus of Example 1 of the present invention in a vehicle.

An active noise cancellation apparatus is an apparatus applied to a vehicle such as an automobile and reducing road noise. The active noise cancellation apparatus reduces road noise not by generating control noise from a speaker in a vehicle interior. As shown in FIG. 1, road surface vibration caused by moving of a vehicle is transmitted from right and left wheels 10, 20 via a suspension system 80 to a panel member 31 such as a panel in a trunk room and a floor panel and as a result, road noise is generated in an interior of the vehicle by vibration of the panel member 31.

In this example, vibrations of right and left rear wheels 10, are used as reference signals, vibration of a rear suspension member 70 is used as an error signal, and a vibration generator 91 imparts vibration to the rear suspension member 70. Owing to this configuration, effects of vibration components of the right and left rear wheels 10, are reduced from the vibration of the rear suspension member 70. As a result, road noise generated by the vibration of the rear suspension member 70 and vibration of the panel member 31 transmitted from the rear suspension member 70 can be reduced. The details will be described below.

Connection Mechanism from Wheels to Panel Member

A connection mechanism from the right and left rear wheels 10, 20 to the panel member 31 will be described with reference to FIG. 1. As shown in FIG. 1, the right and left rear wheels 10, 20 and the panel member 31 are connected to each other by way of a rear suspension system 80.

Right and left axles 40, 40 are respectively connected to metal wheels 12, 22 of the right and left wheels 10, 20 which respectively hold tires 11, 21. Upon rotational driving force from a driving source such as an engine being transmitted to the right and left axles 40, 40 by way of differentials not shown, the axles 40 respectively rotate the right and left rear wheels 10, 20.

On each of the right and left rear sides of a vehicle, a knuckle 51 rotatably supports an axle 40. That is to say, when the metal wheel 12 or 22 moves in a radial direction, the knuckle 51 move in association with the radial moves of the metal wheel 12 or 22. That is to say, the knuckle 51 is vibrated by vibration transmitted from the metal wheel 12 or 22 via the tire 11 or 21.

The knuckle 51 is connected to a lower arm 54 and an upper arm 55 as suspension arms via bushes 52, 53 comprising viscoelastic bodies. The lower arm 54 and the upper arm 55 are connected to the rear suspension member 70 via bushes 56, 57 comprising viscoelastic bodies. A member mount 59 comprising a viscoelastic body is attached between the rear suspension member 70 and a lower surface of the panel member 31.

Moreover, a lower end of a shock absorber 61 is fixed to the lower arm 54. An upper support 62 comprising a viscoelastic body is attached to an upper end of the shock absorber 61. The upper support 62 is connected to a wheel housing 32 (a member for housing the tire 11) of a vehicle body. The wheel housing 32 is connected to the panel member 31.

The abovementioned structure securely supports the vehicle body (including the panel member 31 and the wheel housings 32) and, at the same time, makes it difficult for vibration input from road surfaces by moving of the vehicle to be transmitted from the rear wheels 10, 20 to the vehicle body. Here, the rear suspension system 80 is a device which includes the knuckles 51, the lower arms 54, the upper arms 55, the rear suspension member 70, the member mounts 59, the shock absorbers 61, the upper supports 62, and the respective bushes 52, 53, 56, 57.

The panel member 31 is formed in a thin plate shape and the respective components parts constituting the rear suspension system 80 have higher rigidity than the panel member 31. Moreover, portions of the wheel housings 32 near positions where the upper supports 62 are attached have higher rigidity than the panel member 31. That is to say, resonance frequency of the rear suspension system 80 as a whole, resonance frequencies of the respective component parts constituting the rear suspension system 80, and resonance frequency of the portions of the wheel housings 32 near the positions where the upper supports 52 are attached are higher than resonance frequency of the panel member 31.

Furthermore, a vibration generator 91 is placed on a middle portion of the rear suspension member 70 in a vehicle width direction. The vibration generator 91 is equipped with an electromagnetic actuator such as a solenoid and a voice coil and actively generates vibration force upon being supplied with an electric current. That is to say, vibration force generated by the vibration generator 91 vibrates the rear suspension member 70 on which the vibration generator 91 is placed. This vibration force acts mainly in a vertical direction of the vehicle. A control signal for driving the vibration generator 91 is generated by a controller 100 mentioned later. Since structure of the electromagnetic actuator used in the vibration generator 91 is known, its detailed description is omitted.

Furthermore, acceleration sensors as right and left reference signal detectors 92, 93 are respectively placed on the right and left knuckles 51, 51. The reference signal detectors 92, 93 respectively detect vibrations of the right and left knuckles 51 in the vertical direction of the vehicle.

On the other hand, an acceleration sensor as an error signal detector 94 is placed on a middle portion of the rear suspension member 70 in a vehicle width direction. In particular, the error signal detector 94 is placed on a portion of the rear suspension member 70 on which the vibration generator 91 is attached. This error signal detector 94 detects vibration of this attached portion in the vertical direction of the vehicle. That is to say, this error signal detector 94 detects vibration obtained by combining vibrations transmitted from the right and left rear wheels 10, 20 and the vibration force generated by the vibration generator 91.

Control Block Diagram

Figure 2:
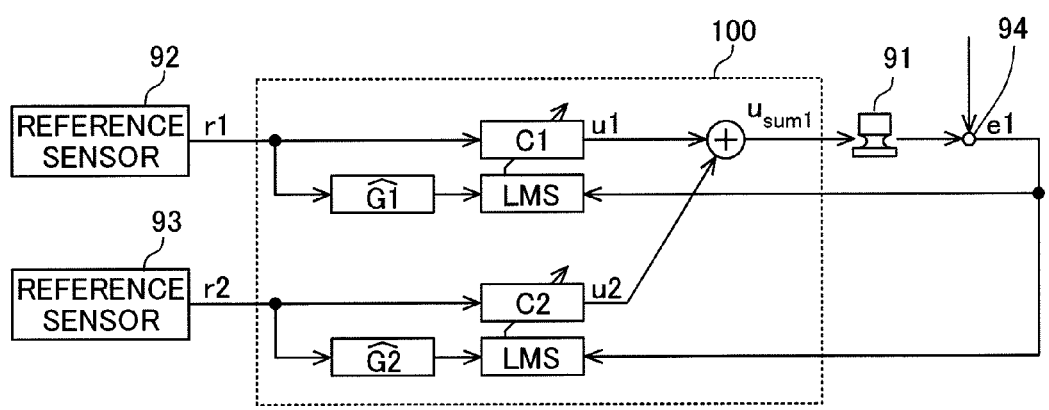
FIG. 2 is a block diagram of control of a vibration generator by a controller shown in FIG. 1.

Next, a block diagram of control of the vibration generator 91 by the controller 100 will be described with reference to FIG. 2. As shown in FIG. 2, the controller 100 uses reference signals r1, r2 detected by the right and left reference signal detectors 92, 93 and an error signal e1 detected by the error signal detector 94, and controls the vibration generator 91 by performing adaptive control so as to reduce (cancel) the error signal e1.

Filtered X LMS algorithm is used as an example of adaptive control algorithm in this example. In addition to this, however, it is possible to use LMS algorithm, RLS algorithm, FDA algorithm, direct LMS algorithm, direct RLS algorithm, or direct FDA algorithm.

That is to say, the controller 100 calculates output values u1, u2 by respective adaptive controls. In the respective adaptive controls, the output values u1, u2 are calculated so as to reduce the error signal e1. When the adaptive controls are performed by using Filtered-X LMS algorithm, previously-identified values G1$\hat{h}$, G2$\hat{h}$ of transfer characteristics of respective secondary paths are used. It should be noted that a mark "^" on symbols in the drawings is called a hat and means an identified value. However, the mark "^" is described as "h" in the text for convenience of description.

Moreover, the controller 100 calculates a control signal $u_{sum1}$ by adding all the output values u1, u2. This control value $u_{sum1}$ serves as a control signal for driving the vibration generator 91. Effects of the respective reference signals r1, r2 on the error signal e1 is reduced by driving the vibration generator 91 based on this control signal $u_{sum1}$.

In this example, vibrational force of the vibration generator 91 acts to reduce vibration of the rear suspension member 70 on which the error signal detector 94 is placed. Here, the vibration generator 91 is placed on the rear suspension member 70 on which the error signal detector 94 is placed. Therefore, the vibration generator 91 generates vibrational force so as to reduce vibration of the component part on which the vibration generator 91 in itself is placed.

However, the vibration to be reduced by the vibration generator 91 is components attributable to the reference signals r1, r2. Here, the reference signals r1, r2 are vibrations of the right and left rear wheels 10, 20. Accordingly, vibration components of the rear suspension member 70 attributable to the vibrations of the right and left rear wheels 10, 20 and so on are reduced by the vibration generator 91.

Furthermore, the controller 100 performs respective adaptive controls based on each of the reference signals r1, r2 and the error signal e1 so as to reduce the error signal e1. By doing so, the respective output values u1, u2 serve as signals for reducing the components of the error signal e1 attributable to the respective reference signals r1, r2. Subsequently, the controller 100 controls the vibration generator 91 based on the control signal $u_{sum1}$, which is a sum of the respective output values u1, u2. Consequently, the active noise cancellation apparatus can reduce the components of the error signal e1 attributable to the respective reference signals r1, r2.

Moreover, in this example, the vibration generator 91 and the error signal detector 94 are placed not on a panel member 31 but on the rear suspension member 70. Advantages of placing the vibration generator 91 and the like not on the panel member 31 but on the rear suspension member 70 will be described below.

Since the penal member 31 is formed in a thin plate shape, the panel member 31 has a lower primary resonance frequency than the rear suspension member 70 having a higher rigidity. Therefore, a frequency range of vibration of the panel member 31 generated due to vibration input from road surfaces sometimes contains primary resonance frequency of the panel member 31. In such a case, vibration around the primary resonance frequency of the panel member 31 becomes stronger and vibrations at its higher order frequencies also occur.

Therefore, in order to reduce vibration of the panel member 31 by a structure in which the vibration generator 91 and the error signal detector 94 are placed on the panel member 31, it is necessary to control the vibration generator 91 not only in a range of the primary resonance frequency of the panel member 31 but also in ranges of its higher order frequencies. Therefore, the vibration generator 91 needs to exhibit a function to suppress vibration in a very wide frequency range. However, since vibration of the rear suspension member 70 is smaller at higher order frequencies than that of the penal member 31, a range of frequency to be controlled by the vibration generator 91 can be narrower in this example than in a case where the vibration generator 91 and the like are placed on the panel member 31.

If the range of frequency to be controlled should include a high frequency range (e.g., several kHz or more), it is necessary to upgrade the vibration generator 91, various sensors, and an electronic circuit for generating a control signal for the vibration generator 91. Specifically, it is necessary to shorten sampling time of the various sensors and increase arithmetic processing speed of the electronic circuit. In addition, the vibration generator 91 needs to have responsiveness which is fast enough to respond to the shortened sampling time. Accordingly, these upgrades incur an increase in cost of the overall apparatus. Even if a high frequency range is controlled, the control of the high frequency range is inevitably poor in responsiveness when compared to control of a low frequency range. Therefore, after all, noise cancellation performance deteriorates in the high frequency range.

In contrast to this, in this example, it is not necessary to upgrade the vibration generator 91, the various sensors and the like because the vibration generator 91 and the like are placed on the rear suspension member 70. Without upgrading, high noise cancellation performance can be exhibited. Therefore, this configuration leads to cost reduction.

Moreover, since vibration of the panel member 31 around primary resonance frequency is great, if the vibration generator 91 is placed on the panel member 31, the vibration generator 91 needs to generate vibration which is large enough in amplitude to suppress such vibration. This results in an increase in size of the vibration generator 91. In this example, however, there is no need to do so and this leads to a decrease in size of the vibration generator 91.

Furthermore, a floor panel is a panel member having a largest area among the variety of panel members 31 of vehicle component parts. Since vibration of the floor panel shows complex behaviors, even if vibration of only a certain portion of the floor panel can be reduced, road noise occurs because other portions of the floor panel vibrate. Even if the vibration generator 91 is placed on the floor panel, road noise caused by vibration of the other portions of the floor panel on which the vibration generator 91 is not placed cannot be sufficiently reduced for that reason. Although it is possible to place a number of vibration generators 91 on the floor panel, this incurs very high cost.

However, placing the vibration generator 91 not on the floor panel but on the rear suspension member 70 prevents the abovementioned problems from occurring. Accordingly, this also contributes to an improvement in road noise reduction performance and cost reduction.

Moreover, in this example, the vibration generator 91 and the error signal detector 94 are placed in a middle in a width direction of the vehicle. Owing to this arrangement, vibration transfer distances from the right and left rear wheels 10, 20 can be approximately equal to each other. That is to say, vibration transfer distances from the respective reference signal detectors 92, 93 to the vibration generator 91 and the error signal detector 94 can be approximately equal to each other. This makes it easy to reliably reduce the respective vibrations transmitted from the right and left rear wheels 10, 20.

Example 2

Figure 3:
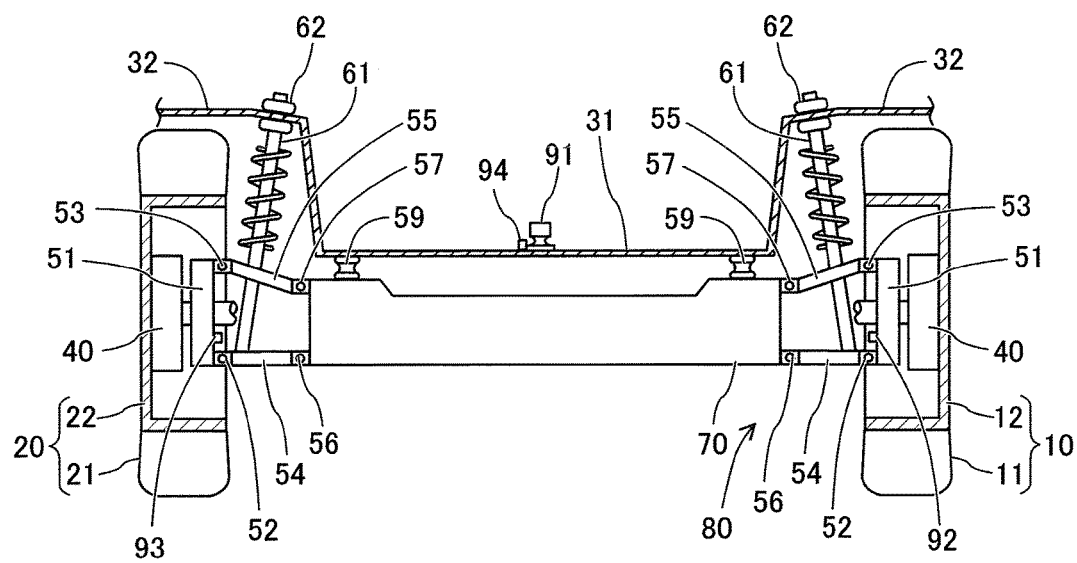
FIG. 3 is a view showing a configuration of an active noise cancellation apparatus of Example 2 of the present invention in a vehicle.

An active noise cancellation apparatus of Example 2 will be described with reference to FIGS. 3 and 4. This example is different from the above example in locations of the vibration generator 91 and the error signal detector 94. As shown in FIG. 3, the vibration generator 91 and the error signal detector 94 are placed in a middle portion of the panel member 31 in a trunk room in a vehicle width direction.

Of the various panel members 31, a panel in a trunk room is located in an intermediate position between the right and left rear wheels 10, 20 and is a member which directly supports the rear suspension system 80. Therefore, the abovementioned problems mentioned in Example 1 are less liable to occur in the panel in the trunk room than in the floor panel. That is to say, road noise can be sufficiently reduced by placing the vibration generator 91 and the error signal detector 94 on the panel in the trunk room.

Figure 4:
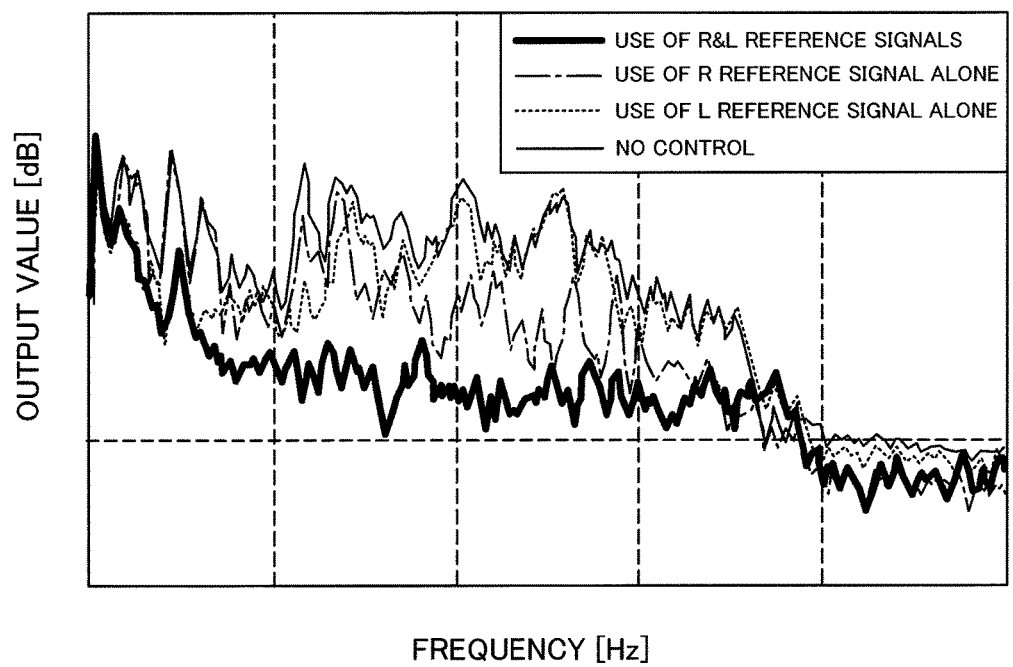
FIG. 4 is a graph showing magnitude of error signals corresponding to frequency when a vibration generator is under control using right and left reference signals, using only the right reference signal and using only the left reference signal, and under no adaptive control.

A result of an experiment on vibration suppressing effect in a trunk room in the present example is shown in FIG. 4. For comparison purposes, also shown are results of experiments in which the vibration generator 91 was under no control (thin solid line), under control using only the right reference signal (alternate long and short dash line), and under control using only the left reference signal (dashed line). The result of the experiment of this example in which the vibration generator 91 was under control using the right and left reference signals is indicated by thick solid line.

As shown in FIG. 4, it was demonstrated that an effect of this example is greater than a combination of effects of control using the right reference signal or the left reference signal alone. That is to say, a high effect can be obtained by performing adaptive controls based on the right and left reference signals and controlling the vibration generator 91 based on a sum of their output values.

Example 3

Figure 6:
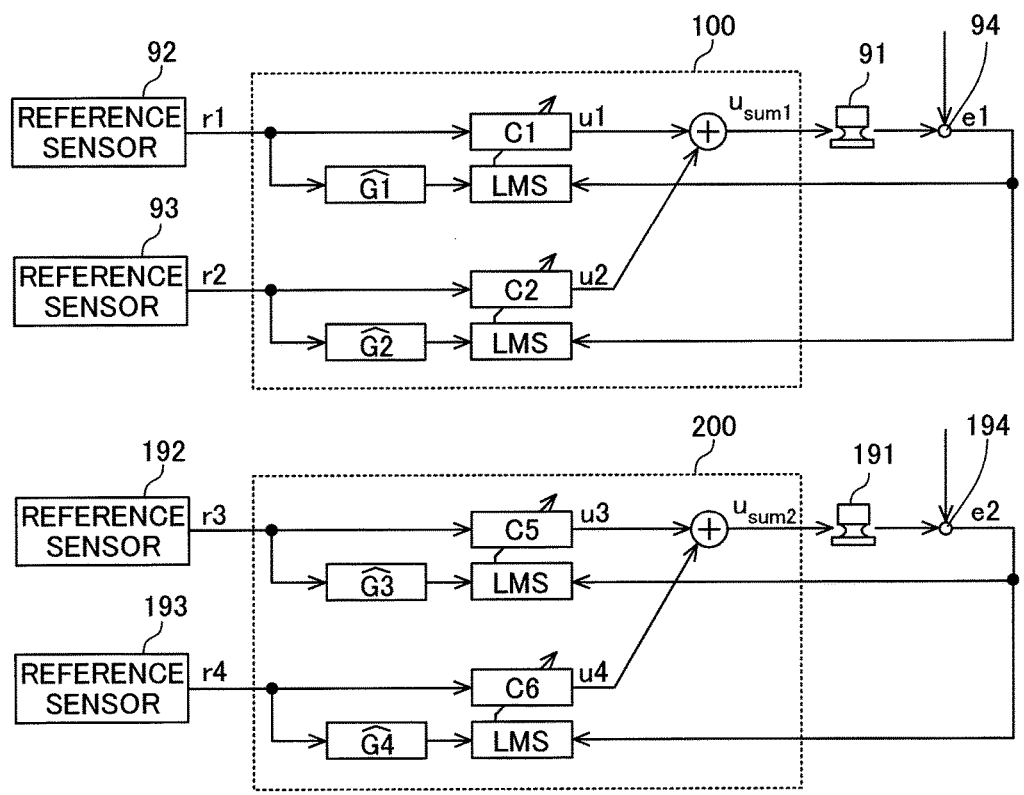
FIG. 6 is a block diagram of control of vibration generators by respective controllers shown in FIG. 5.
Figure 7:
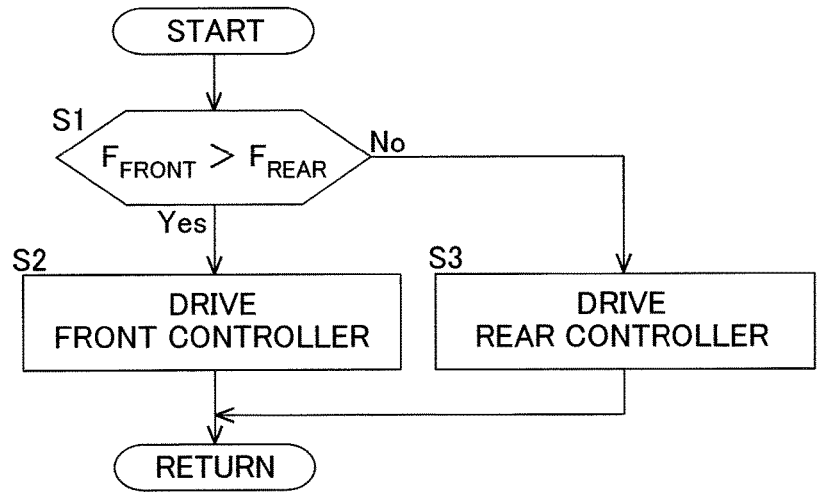
FIG. 7 is a flow chart showing control of vibration generators by controllers on front and rear sides of the vehicle shown in FIG. 5.

An active noise cancellation apparatus of Example 3 will be described with reference to FIGS. 5 to 7. This example is different from the above examples in that a unit comprising a vibration generator, reference signal detectors, and a controller is placed not only on a rear side but also on a front side.

Figure 5:
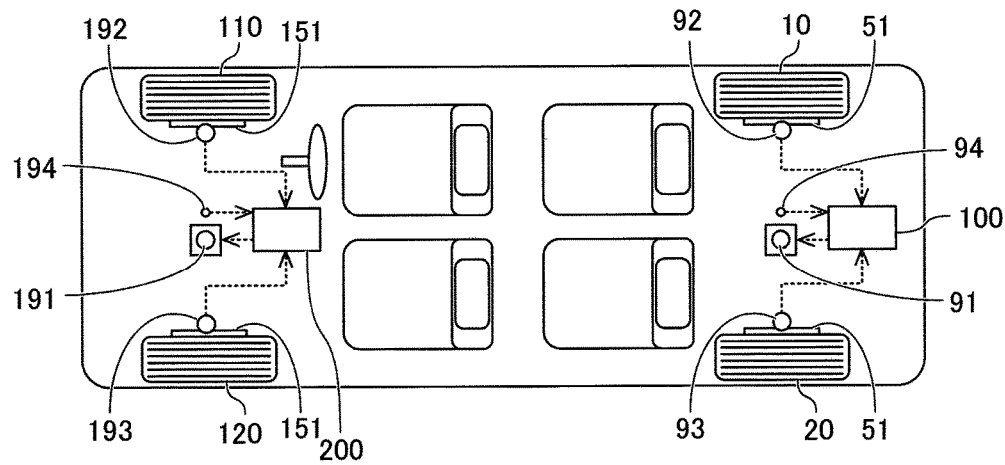
FIG. 5 is a view showing a configuration of an active noise cancellation apparatus of Example 3 of the present invention in a vehicle.

As shown in FIG. 5, similarly to Example 1, a vibration generator 91 and an error signal detector 94 are placed on a rear suspension member 70, and reference signal detectors 92, 93 are placed on knuckles 51, 51 of right and left rear wheels 10, 20 and a controller 100 is placed on a rear seat side.

In addition, in this example, a vibration generator 191 and an error signal detector 194 are placed on a front side of a floor panel, reference signal detectors 192, 193 are placed on knuckles 151, 151 of right and left front wheels 110, 120, and a controller 200 is placed on a front seat side. It should be noted that the vibration generator 191 and the error signal detector 194 can be placed on a front suspension member.

The vibration generator 191, the reference signal detectors 192, 193 and the error signal detector 194 have similar structures as those of the above examples. As shown in FIG. 6, the controller 200 is substantially the same as the controller 100. That is to say, the controller 200 uses reference signals r3, r4 detected by the right and left reference signal detectors 192, 193 and an error signal e2 detected by the error signal detector 194, and controls the vibration generator 191 by performing adaptive control so as to reduce (cancel) the error signal e2. It should be noted that G3$h$, G4$h$, C5, C6, u3, u4, and $u_{sum2}$ in the controller 200 shown in FIG. 6 correspond to G1$h$, G2$h$, C1, C2, u1, u2, and $u_{sum1}$ in the controller 100, respectively.

Furthermore, in this example, the rear controller 100 and the front controller 200 are selectively driven as mentioned below. As shown in FIG. 7, a front seat side load $F_{FRONT}$ and a rear seat side load $F_{REAR}$ are compared with each other (S1). When the front seat side load $F_{FRONT}$ is greater, the controller 200 on the front seat side is driven. On the other hand, when the rear seat side load $F_{REAR}$ is greater, the controller 100 on the rear seat side is driven (S3).

Here, vibrations as sources of road noise can be respectively input from the vehicle rear and front wheels 10, 20, 110, 120. Therefore, road noise can be reliably reduced by reducing effects input from all the wheels 10, 20, 110, 120. However, it incurs high cost to place the same number of vibration generators and the like as that of wheels 10, 20, 110, 120. Therefore, the number of vibration generators 91, 191 is set to one and the number of error signal detectors 94, 194 is also set to one on each of the rear side and the front side of the vehicle.

That is to say, the vibration generator 91 placed on the vehicle rear side is controlled based on right and left reference signals r1, r2 on the vehicle rear side, while the vibration generator 191 placed on the vehicle front side is controlled based on right and left reference signals r3, r4 on the vehicle front side. Consequently, road noise can be reliably reduced, while attaining cost reduction.

However, if the vibration generators 91, 191 are controlled by the controllers 100, 200 on the vehicle rear and front sides in every case, it will require a large electric power consumption. Then power consumption can be reduced by controlling the vibration generators 91, 191 only when an applied vibration has a greater effect. Here, as vibration is applied to a position at which load of one or more occupants and luggage is greater, the applied vibration has a greater effect on road noise. Therefore, upon driving one of the controllers 100, 200 having a front load $F_{FRONT}$ or a rear load $F_{REAR}$, whichever is greater, the vibration generators 91, 191 on the rear and front sides of the vehicle can be controlled in accordance with load distribution of one or more occupants and luggage. As a result, road noise can be reduced while reducing power consumption.

Example 4

An active noise cancellation apparatus of Example 4 will be described with reference to FIGS. 8 to 10. Example 4 is different from Example 1 in that two vibration generators 91, 291 are placed on the rear seat side, and controllers 100, 300 corresponding to the respective vibration generators 91, 291 are provided.

Figure 8:
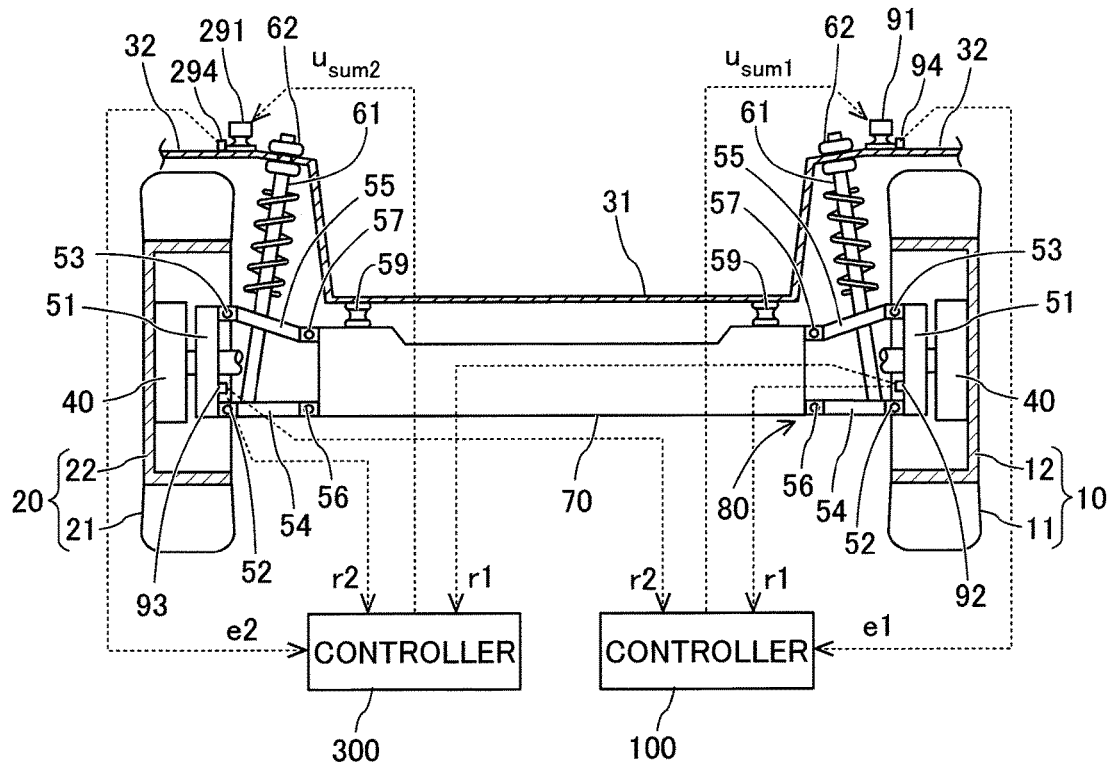
FIG. 8 is a view showing a configuration of an active noise cancellation apparatus of Example 4 of the present invention in a vehicle.

As shown in FIG. 8, one vibration generator 91 is placed on a right wheel housing 32, and the other vibration generator 291 is placed on a left wheel housing 32. The respective vibration generators 91, 291 are placed on the wheel housings 32 at positions closer to upper supports 62 than to a panel member 31, more specifically, at positions near portions on which the upper supports 62 are fixed (portions having higher rigidity).

Figure 9:
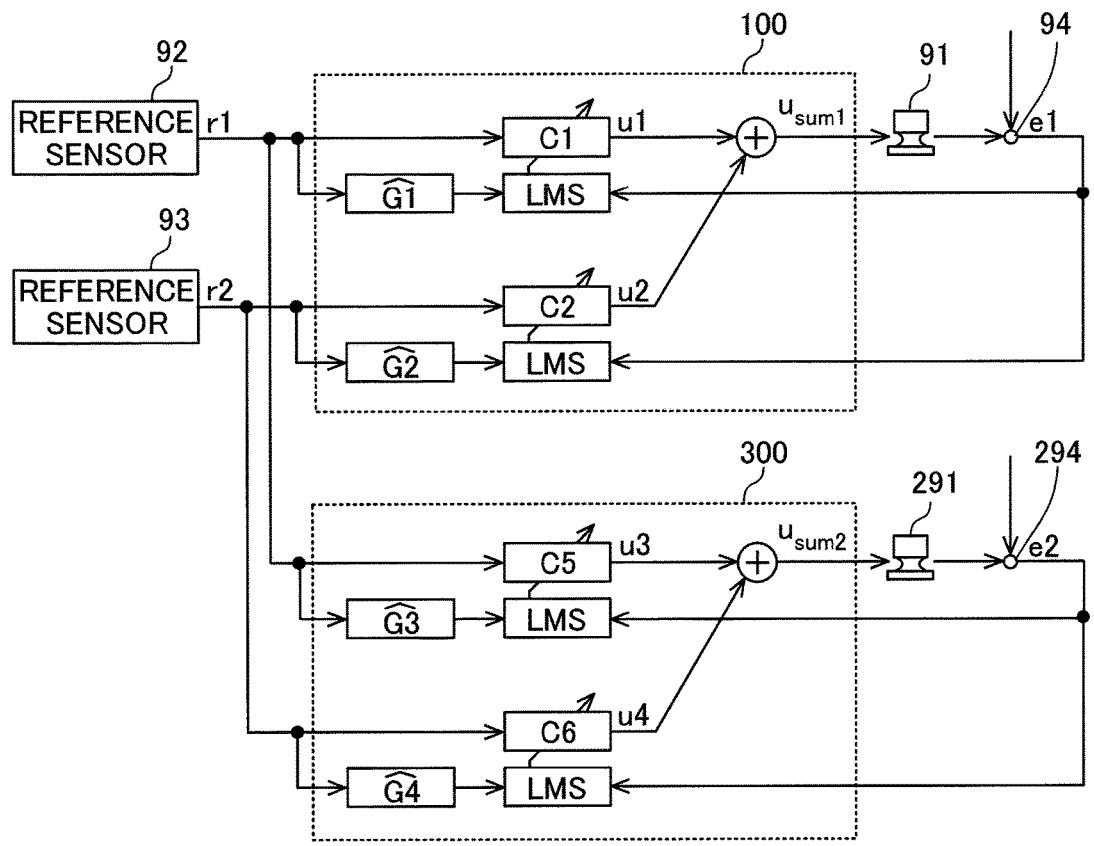
FIG. 9 is a block diagram of control of vibration generators by controllers shown in FIG. 8.
Figure 10:
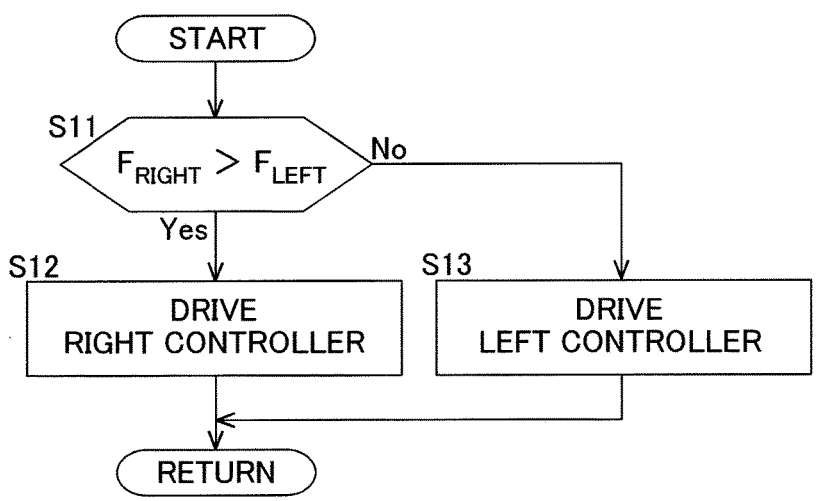
FIG. 10 is a flow chart showing control of the vibration generators by the controllers on right and left sides of a vehicle shown in FIG. 8.

As shown in FIG. 9, one controller 100 uses reference signals r1, r2 detected by right and left reference signal detectors 92, 93 and an error signal e1 detected by one error signal detector 94 and controls the vibration generator 91 so as to reduce (cancel) the error signal e1. The other controller 300 uses the reference signals r1, r1 detected by the right and left error signal detectors 92, 93 and an error signal e2 detected by another error signal detector 294 and controls the vibration generator 291 so as to reduce (cancel) the error signal e2.

Then the right and left controllers 100, 300 are selectively driven as follows. As shown in FIG. 10, a right load $F_{RIGHT}$ and a left load $F_{LEFT}$ are compared with each other (S11). When the right load $F_{RIGHT}$ is greater, the right controller 100 is driven (S12). On the other hand, when the left load $F_{LEFT}$ is greater, the left controller 300 is driven (S13).

Consequently, the vibration generator 91 or 291, whichever has a greater noise cancellation effect, can be driven.

Although the vibration generators 91, 291 are respectively placed on the right and left wheel housings 32 in this example, the vibration generators 91, 291 can be respectively placed on right and left sides of a suspension member 70 or a panel in a trunk room.

Others

The reference signal detectors in the above examples detect vibrations of knuckles 51 as reference signals by using acceleration sensors. In addition to this, the reference signal detectors can detect noises at positions of knuckles 51 as reference signals by using microphones.

It should be noted that in a case of a compact car, it is possible to place reference signal detectors 92, 93, 192, 193 on knuckles of all four wheels, place one vibration generator 91 and one error signal detector 94 on a rear suspension member 70 or the like and control the vibration generator 91 based on four reference signals and one error signal.

What is claimed is:

1. An active noise cancellation apparatus for actively reducing road noise in an interior of a vehicle generated due to vibration input from road surfaces to wheels, comprising:
    a plurality of reference signal detectors placed respectively on right and left knuckles for respectively supporting right and left wheels, and detecting, as reference signals, vibrations of the right and left wheels or noises caused by the vibrations of the right and left wheels, respectively;
    a vibration generator placed on a component part in a vibration transmission path from the wheels to the interior and applying vibration force to the component part;
    an error signal detector placed on the component part and detecting vibration of the component part as an error signal; and
    a controller for performing respective adaptive controls based on each of the reference signals and the error signal so as to reduce the error signal, and controlling the vibration generator based on a sum of output values of the respective adaptive controls.

2. The active noise cancellation apparatus according to claim 1,
    wherein the vibration generator and the error signal detector are placed on a suspension member or each wheel housing for supporting each of the wheels.

3. The active noise cancellation apparatus according to claim 1,
    wherein the vibration generator and the error signal detector are placed on a panel in a trunk room.

4. The active noise cancellation apparatus according to claim 1,
    wherein the vibration generator and the error signal detector are placed in a middle in a width direction of the vehicle.

5. The active noise cancellation apparatus according to claim 1 wherein:
    a plurality of sets of the plurality of reference signal detectors, the vibration generator, and the error signal detector are respectively placed on a front side and a rear side of the vehicle; and
    the controller controls the vibration generator on the front side of the vehicle based on the reference signals and the error signal on the front side of the vehicle, and the vibration generator on the rear side of the vehicle based on the reference signals and the error signal on the rear side of the vehicle.

6. The active noise cancellation apparatus according to claim 5,
    wherein the controller controls the vibration generator on the front side and the vibration generator on the rear side in accordance with load distribution of one or more occupants and luggage.

7. The active noise cancellation apparatus according to claim 1, wherein:
    the vibration generator and the error signal detector are placed on each of a right side and a left side of the vehicle; and
    the controller respectively controls the respective vibration generators on the right side and the left side based on the respective error signal detectors placed on the right side and the left side in accordance with load distribution of one or more occupants and luggage.

8. The active noise cancellation apparatus according to claim 1,
    wherein the vibration generator includes an electromagnetic actuator, placed on the component part in the vibration transmission path from the wheels to the interior of the vehicle, that applies vibration force to the component part, which vibrates that component part.

9. The active noise cancellation apparatus according to claim 1,
    wherein the error signal detector detects vibration of the component part caused by vibration of the left and right wheels and the vibrations of the component part caused by the vibration force applied to the component part by the vibration generator.

* * * * *